(12) United States Patent  
Park et al.

(10) Patent No.: US 9,799,138 B2
(45) Date of Patent: Oct. 24, 2017

(54) DEVICE AND METHOD FOR PROCESSING THREE-DIMENSIONAL LIGHTING

(71) Applicant: Samsung Electronics Co., Ltd., Gyeonggi-do (KR)

(72) Inventors: Joon-Yong Park, Seoul (KR); Jung-Eun Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 804 days.

(21) Appl. No.: 14/262,011

(22) Filed: Apr. 25, 2014

(65) Prior Publication Data

US 2014/0325403 A1    Oct. 30, 2014

(30) Foreign Application Priority Data

Apr. 25, 2013  (KR) .................. 10-2013-0046147

(51) Int. Cl.
  *G06F 15/00*  (2006.01)
  *G06F 13/00*  (2006.01)
  *G06T 15/80*  (2011.01)
  *G06F 9/44*   (2006.01)
  *G06F 3/048*  (2013.01)

(52) U.S. Cl.
  CPC .............. *G06T 15/80* (2013.01); *G06F 3/048* (2013.01); *G06F 9/4443* (2013.01)

(58) Field of Classification Search
  CPC ................. G06T 5/00; G06T 15/005
  USPC ................. 715/763–765, 851–853, 840–843
  See application file for complete search history.

(56) References Cited

U.S. PATENT DOCUMENTS

| | | | |
|---|---|---|---|
| 2006/0087508 A1* | 4/2006 | Drexler ..................... | G06T 5/00 345/427 |
| 2007/0014486 A1* | 1/2007 | Schiwietz .......... | G01R 33/4824 382/276 |
| 2007/0097123 A1* | 5/2007 | Loop .................... | G06T 11/203 345/442 |
| 2010/0085359 A1 | 4/2010 | Wu et al. | |
| 2012/0242664 A1* | 9/2012 | Athans .................... | G06T 15/50 345/426 |
| 2014/0267229 A1* | 9/2014 | Ding ..................... | G09B 25/04 345/419 |
| 2014/0267271 A1* | 9/2014 | Billeter ................ | G06T 15/005 345/426 |

\* cited by examiner

*Primary Examiner* — Kevin Nguyen
(74) *Attorney, Agent, or Firm* — The Farrell Law Firm, P.C.

(57) ABSTRACT

A three-dimensional (3D) lighting processing device and method that apply a partial 3D lighting effect to a two-dimensional (2D) image is provided. The 3D lighting processing device includes a first information providing unit that provides a first image including normal direction information for a shade effect and a second image including color information, a second information providing unit that provides a third image including lighting area information, and a shader unit that detects, from the first image, an area corresponding to the lighting area information of the third image as a lighting application area, and performs rendering by applying the detected lighting application area to a 2D Graphic User Interface (GUI).

18 Claims, 5 Drawing Sheets

Normal Map        Weight Map

Normal Map  Weight Map  Color (Diffuse) Map  Rendering Result

DEVICE AND METHOD FOR PROCESSING THREE-DIMENSIONAL LIGHTING

PRIORITY

This application claims priority under 35 U.S.C. §119(a) to Korean Application Serial No. 10-2013-0046147, which was filed in the Korean Intellectual Property Office on Apr. 25, 2013, the entire content of which is incorporated herein by reference.

BACKGROUND OF THE INVENTION

1. Field of the Invention

The present invention relates generally to a device and method of processing a three-dimensional (3D) lighting, and more particularly, to a device and method of processing 3D lighting that provides a partial 3D lighting effect to a two-dimensional (2D) Graphic User Interface (GUI).

2. Description of the Related Art

A simple 2D GUI may be expressed to provide a flowing and elegant GUI by providing a depth and lighting effect to the 2D GUI using a normal map, i.e. a bump map, and a GPU shader technology from among 3D graphic technologies.

Particularly, when providing the lighting effect for the 2D GUI, the lighting effect may be applied to the overall 2D GUI using the normal map.

When only the lighting effect is applied to the overall 2D GUI, a lighting effect for a predetermined portion of the 2D GUI or a partial lighting effect required by a User eXperience (UX) designer may not be applied. Also, when the lighting effect is applied to the overall 2D GUI, power consumption may increase and performance deteriorates.

When a lighting effect is partially applied to the 2D GUI according to a conventional scheme, it is difficult to effectively change and express a lighting effect for a portion that is externally requested since a constant, i.e. fixed, value included in a program is used. That is, there is no data for applying a partial lighting effect and thus, external access and management may not be allowed.

SUMMARY OF THE INVENTION

Accordingly, an aspect of the present invention provides a three-dimensional (3D) lighting processing device and method that may apply a partial 3D lighting effect to a two-dimensional (2D) Graphic User Interface (GUI).

In accordance with another aspect of the present invention, a 3D lighting processing device is provided that includes a first information providing unit that provides a first image including normal direction information for a shade effect and a second image including color information; a second information providing unit that provides a third image including lighting area information; and a shader unit that detects, from the first image, an area corresponding to the lighting area information of the third image as a lighting application area, and performs rendering by applying the detected lighting application area to a 2D GUI.

In accordance with another aspect of the present invention, a 3D lighting processing method is provided that includes providing a first image including normal direction information for a shade effect, a second image including color information, and a third image including lighting area information associated with an area to which a lighting effect is to be applied; and detecting an area corresponding to the lighting area information of the third image from the first image, as a lighting application area, and performing rendering by applying the detected lighting application area to a 2D GUI.

BRIEF DESCRIPTION OF THE DRAWINGS

The above and other aspects, features, and advantages of the present invention will be more apparent from the following detailed description taken in conjunction with the accompanying drawings, in which:

FIGS. 4A-5D illustrate lighting processes in a terminal according to various embodiments of the present invention.

DETAILED DESCRIPTION OF EMBODIMENTS OF THE PRESENT INVENTION

Figure 1:
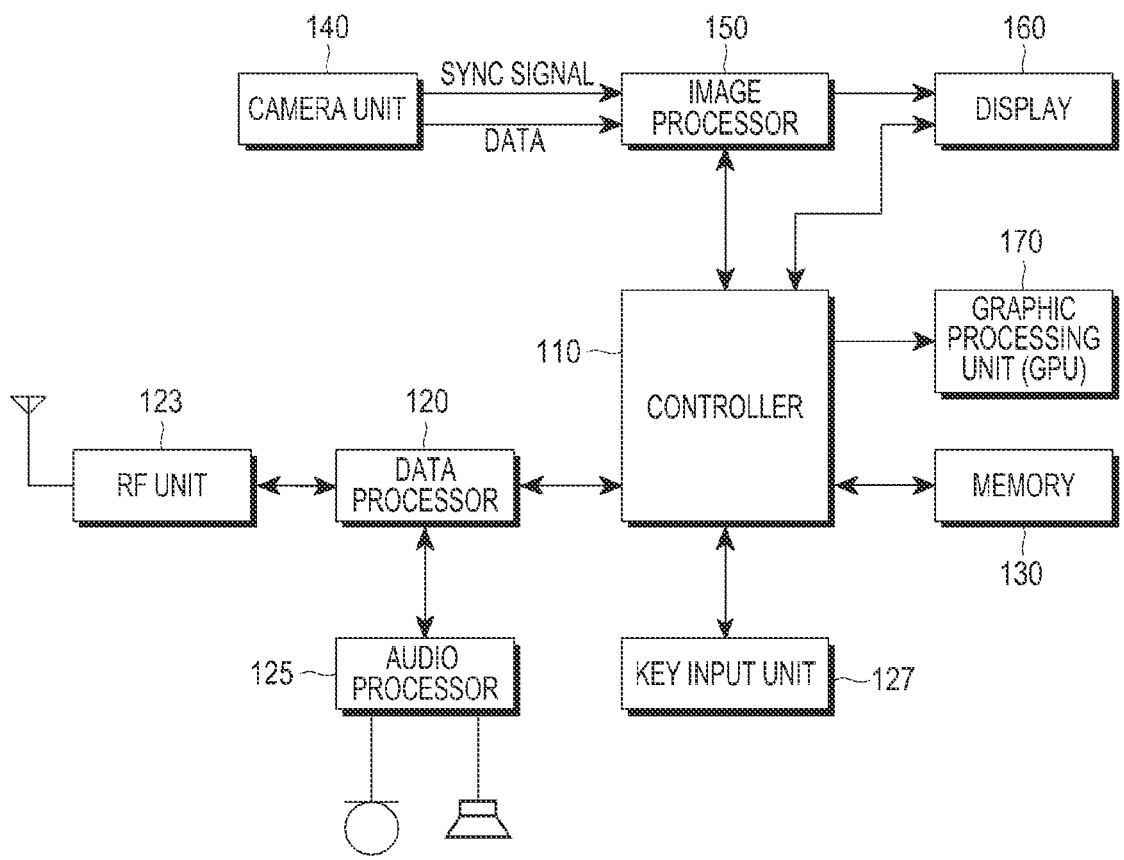
FIG. 1 is a diagram illustrating a terminal according to various embodiments of the present invention.

Hereinafter, various embodiments of the present invention will be described with reference to the accompanying drawings. It shall be noted that in the following description, the same elements will be designated by the same reference numerals although they are shown in different drawings. A terminal according to various embodiments of the present invention may include a portable terminal and a stationary terminal.

Here, the portable terminal corresponds to an easily carried and movable electronic device, which may be a video phone, a mobile phone, a smart phone, a WCDMA terminal, a Universal Mobile Telecommunication Service (UMTS) terminal, a Personal Digital Assistant (PDA), a Portable Multimedia Player (PMP), a Digital Multimedia Broadcasting (DMB) terminal, an e-book, a portable computer (notebook, tablet PC, etc.), a digital camera, etc. The fixed terminal includes a desktop personal computer or the like.

FIG. 1 is a diagram illustrating a terminal according to various embodiments of the present invention.

Referring to FIG. 1, an RF unit 123 performs a radio communication function of the terminal. The RF unit 123 includes an RF transmitter to up-convert and amplify a frequency of a transmitted signal, an RF receiver to low-noise amplify a received signal and to down-convert a frequency, and the like. A data processing unit 120 includes a transmitter to encode and modulate the transmitted signal, a receiver to demodulate and decode the received signal, and the like. That is, the data processing unit 120 may be formed of a modem and a codec. Here, the codec is formed of a data codec to process packet data and the like, and an audio codec to process an audio signal such as a voice signal and the like. An audio processing unit 125 plays back a received audio signal output from the audio codec of the data processing unit 120 or transmits a transmitted audio signal generated from a microphone to the audio codec of the data processing unit 120.

A key input unit 127 includes keys required for inputting number and character information, and function keys required for setting various functions.

A memory 130 is formed of a program memory and a data memory. The program memory stores programs for controlling general operations of the terminal and programs for performing a control to apply a partial three-dimensional (3D) lighting effect to a two-dimensional (2D) image. Also, the data memory temporarily stores data generated while the programs are executed.

A controller 110 controls the overall operations of the terminal. According to various embodiments of the present invention, the controller 110 controls application of a partial 3D lighting effect to a 2D GUI through a graphic processing unit 170.

A camera unit 140 captures image data, and includes a camera sensor to convert a captured optical signal into an electric signal, and a signal processing unit to convert an analog image signal captured by the camera sensor into digital data. Here, the camera sensor is assumed to be a Charge-Coupled Device (CCD) sensor or a CMOS sensor, and the signal processing unit may be embodied as a Digital Signal Processor (DSP). Also, the camera sensor and the signal processing unit may be embodied as an integrated unit or as separate units.

An image processing unit 150 performs an Image Signal Processing (ISP) to display an image signal output from the camera unit 140 on a display unit 160, and the ISP performs gamma correction, interpolation, spatial change, image effect, image scaling, Automatic White Balance (AWB), Automatic Exposure (AE), Auto-Focus (AF), and the like. Therefore, the image processing unit 150 processes the image signal output from the camera unit 140 based on a frame unit, and outputs the frame image data based on a feature and a size of the display unit 160. Also, the image processing unit 150 includes an image codec, and compresses frame image data displayed on the display unit 160 based on a set scheme or decompresses compressed frame image data into original frame image data. Here, the image codec may correspond to a JPEG codec, an MPEG4 codec, a Wavelet codec, and the like. The image processing unit 150 is assumed to include an On Screen Display (OSD) function, and may output OSD data based on a screen size displayed based on a control from the controller 110.

The display unit 160 displays an image signal output from the image processing unit 150 on a screen, and displays user data output from the controller 110. Here, the display unit 160 uses an LCD, and in this example, the display unit 160 may include an LCD controller, a memory that may store image data, an LCD display device, and the like. Here, when the LCD is embodied based on a touch screen scheme, the LCD may operate as an input unit. In this example, the display unit 160 may display keys to provide the key input unit 127 via a touch screen scheme.

Also, when the display unit 160 is embodied based on the touch screen scheme and is used as a touch screen unit, which is formed of a Touch Screen Panel (TSP) including a plurality of sensor panels, and the plurality of sensor panels may include a capacitive sensor panel that may recognize a hand touch and an electromagnetic sensor panel that may sense a fine touch such as a touch of a touch pen.

Also, the display unit 160 may perform a display by applying a 3D lighting effect to a corresponding portion of a 2D GUI through the graphic processing unit 170 according to various embodiments of the present invention.

The graphic processing unit 170 may perform rendering by applying a partial 3D lighting effect to a 2D GUI based on a control from the controller 100 according to various embodiments of the present invention.

A configuration of the graphic processing unit 170 will be described with reference to FIG. 2.

Figure 2:
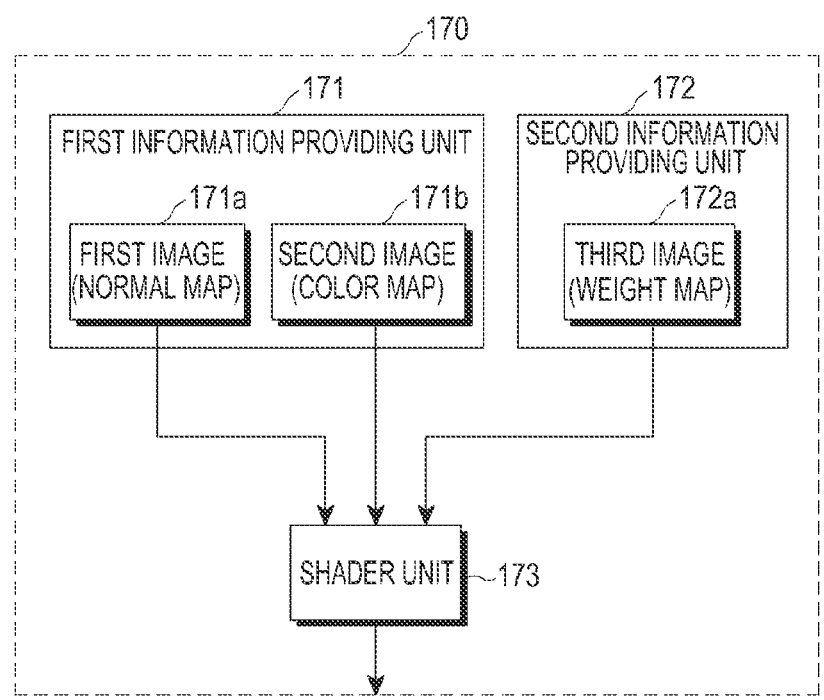
FIG. 2 is a diagram illustrating a graphic processing unit of FIG. 1.

Referring to FIG. 2, the graphic processing unit 170 includes a first information providing unit 171, a second information providing unit 172, and a shader unit 173.

The first information providing unit 171 provides a first image 171a including normal direction information for a shade effect and a second image 171b including color information.

Figure 4A:
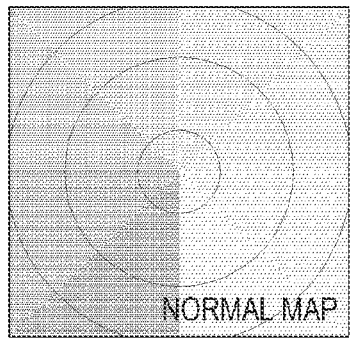

The first image 171a includes a normal map image that provides a normal direction value indicating an inclination value for each side of an object as a normal (X, Y, Z) vector, and may be provided as an image as shown in FIG. 4A.

R, G, and B information of each pixel that forms the normal map image may be expressed as the normal (X, Y, Z) vector for 3D lighting.

A shading (depth) and lighting effect may be applied and expressed in a 2D GUI by applying the normal map image to the 2D GUI. In this example, the lighting effect associated with the normal map image is a lighting effect with respect to the overall 2D GUI. Therefore, a partial lighting operation with respect to the 2D GUI may be performed by applying a third image that performs masking according to various embodiments of the present invention.

Figure 4B:
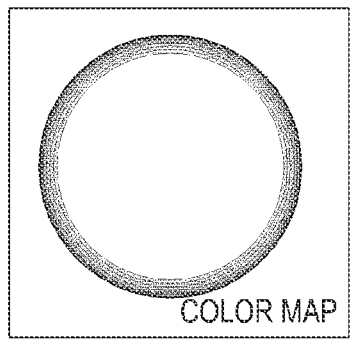

The second image 171b includes a color (diffuse) map that provides color information associated with a 2D image to which a 3D effect is to be applied, with an example image shown in FIG. 4B.

Figure 4C:
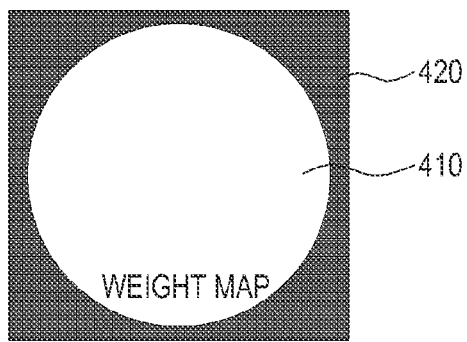

The second information providing unit 172 provides a third image 172a including lighting area information associated with an area to which a lighting is to be applied, and the third image 172a includes a weight map image, with an example image shown in FIG. 4C.

The weight map image is divided into a first area to which a lighting effect is to be provided and a second area to which a lighting effect is not to be provided. A distinguishing pixel value, i.e., weight value, is provided for each of the first area and the second area.

Each pixel of the weight map image corresponds to the pixel value (weight value) obtained by converting an R, G, and B value into a unit numeral, and may be expressed as a value in a range from 0.0 to 1.0.

Therefore, in the first area to which the lighting effect is to be provided, various pixel values, excluding "0", may be provided. In the second area to which the lighting effect is not to be provided, a pixel value of "0" may be provided. When the second area that has a pixel value of zero ("0.0") in the weight map image of the third image 172a, a lighting calculation operation may be skipped with respect to an area of the first image corresponding to the second area.

Therefore, the pixel value of the weight map image may perform masking for detecting, from the first image, an area to which a lighting is to be performed.

The weight map image may correspond to data separately provided to readily correct a corresponding portion of a 2D GUI to which a lighting effect is to be applied, and may correspond to data that may be readily changed by a UX designer.

The shader unit 173 (FIG. 2) detects an area corresponding to the lighting area information of the third image 172a from the first image 171a, and performs rendering by applying the detected lighting application area to the 2D GUI. In this example, the shader unit 173 performs a lighting calculation operation with respect to the detected lighting application area, and expresses a partial 3D lighting effect to the 2D GUI.

Also, the shader unit 173 skips the lighting calculation operation with respect to an area that does not correspond to the lighting area information of the third image 172a in the first image 171a, and performs rendering of the 2D GUI, so as to prevent deterioration in performance.

The shader unit 173 performs the lighting calculation operation with respect to only the lighting application area detected from the first image 171a and performs rendering of the 2D GUI, based on the lighting area information of the third image 172a utilizing Equation (1):

$$2D\ GUI = N*W + C*(1.0-W), \quad (1)$$

with N being a Normal Map based lighting calculation $Color_{RGB}$, W being Weight $Map_{RGB}$, and C being Color (Diffuse) $MAP_{RGB}$, with N being a 3D lighting value calculated by applying a predetermined lighting value to pixels of the first image (normal map), W being a pixel of the third image (weight map); and C being a pixel of the second image (color map).

Also, the shader unit 173 performs the lighting calculation operation with respect to only the lighting application area detected from the first image 171a, and performs rendering of the 2D GUI, based on the lighting area information of the third image 172a utilizing Equation (2):

$$2D\ GUI = ((a1)*(a3) + (a2))*(LV), \quad (2)$$

with a1 being a first image pixel, a2 being a second image pixel, a3 being a third image pixel, and LV being a lighting value. The third image pixel (a3) is a pixel of the first area to which a lighting effect is to be applied in the third image (weight map); the first image pixel (a1) is a pixel placed in a location corresponding to the pixel (a3) of the third image from among the pixels of the first image (normal map); the second image pixel (a2) is a pixel placed in a location corresponding to the pixel (a3) of the third image from among the pixels of the second image (color map); and the lighting value is a value predetermined for a lighting effect.

Also, the shader unit 173 does not perform the lighting calculation operation with respect to an area that does not correspond to the lighting area information of the third image 172a in the first image 171a, and performs rendering of the 2D GUI that applies a pixel of the second image 171b to a pixel of the first image 171a, based on a first image pixel (b1) times a second image pixel (b2), with the first image pixel value (b1) being a pixel placed in a location corresponding to a pixel (b3) of the second area to which the lighting effect is not to be applied in the third image, from among the pixels of the first image (normal map); and the second image pixel value (b2) being a pixel placed in a location corresponding to the pixel (b3) of the second area of the third image to which the lighting effect is not to be applied, from among the pixels of the second image (color map).

A 3D lighting process performed in the terminal as provided above will be described with reference to FIG. 3 through FIG. 5.

Figure 3:
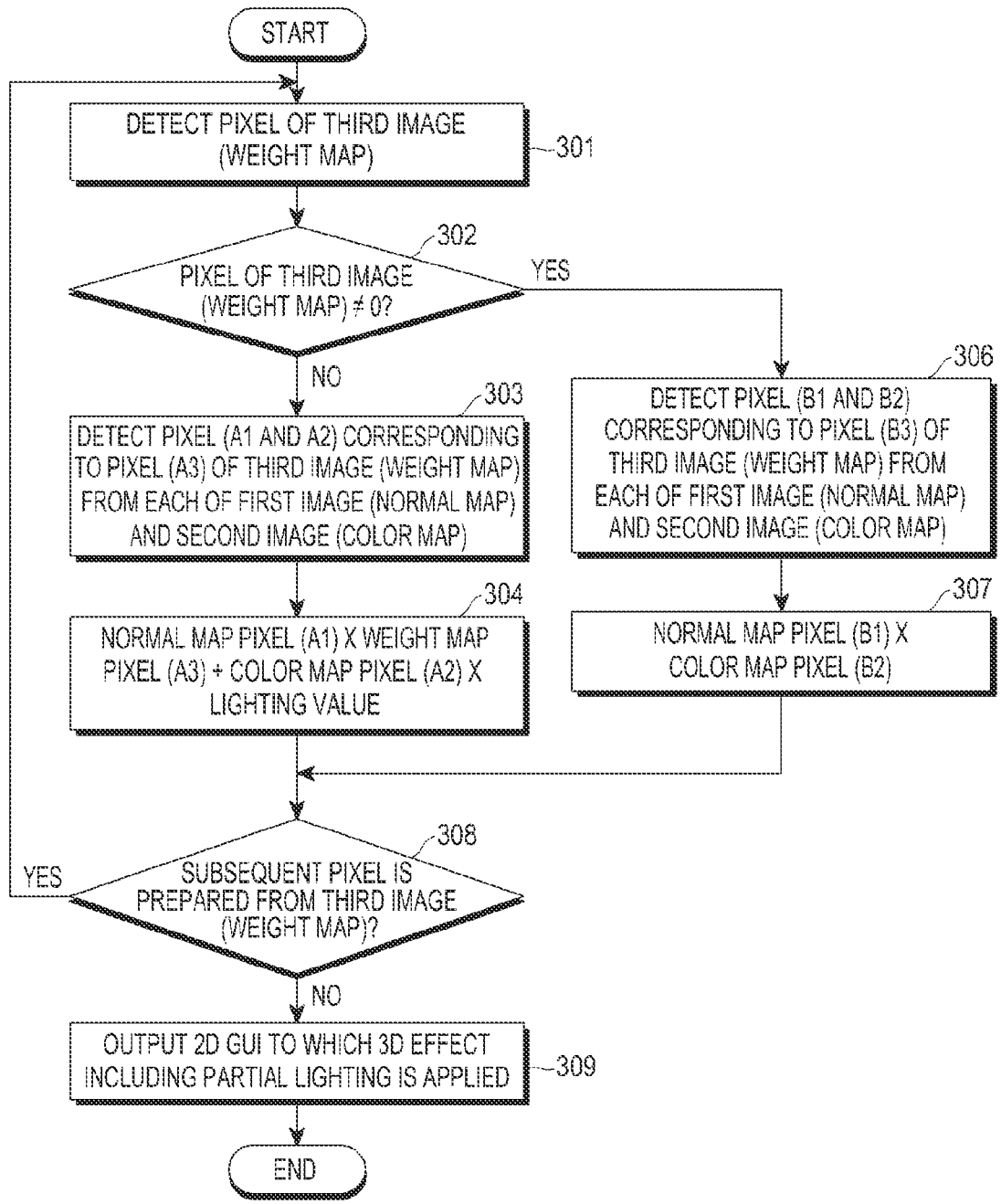
FIG. 3 is a flowchart illustrating a lighting process in a terminal according to various embodiments of the present invention.

FIG. 3 is a flowchart illustrating a lighting processing operation in the terminal according to various embodiments of the present invention, FIG. 4A through FIG. 4C illustrate a first image (normal map), a second image (color map), and a third image (weight map) according to various embodiments of the present invention, and FIGS. 5A-5D illustrate a lighting processing operation of a shader unit according to various embodiments of the present invention.

Hereinafter, an embodiment of the present invention will be described in detail with reference to FIGS. 1 and 2, based on an assumption that a first image (normal map) and a second image (color map) as shown in FIG. 4A and FIG. 4B are provided through the first information providing unit 171, and a third image (weight map) as shown in FIG. 4C is provided through the second information providing unit 172.

Referring to FIG. 3, in Step 301 the shader unit 173 sequentially detects pixels forming the third image as shown in FIG. 4C.

The third image is divided into a first area 410 to which a lighting effect is to be applied and a second area 420 to which the lighting effect is not to be applied. All pixels of the second area 420 where the lighting effect is not to be applied have a pixel value of zero ("0.0"), and the first area 410 where the lighting effect is to be applied may have various pixel values excluding the pixel value of zero.

In Step 302, while sequentially detecting the pixels forming the third image, when the detected pixel (a3) is different from "0", that is, when a pixel of the first area 410 of the third image is detected, in Step 303 the shader unit 173 detects, from among the pixels of the first image, a pixel (a1) placed in a location corresponding to the pixel (a3) of the third image detected in Step 302, and in Step 303 detects, from among the pixels of the second image, a pixel (a2) placed in a location corresponding to the pixel (a3) of the third image detected in Step 302.

In Step 304 the shader unit 173 performs rendering of the 2D GUI including a lighting calculation operation by applying the pixel (a3) of the third image to the pixel (a1) of the first image, adding the pixel (a2) of the second image to a result of the application, and applying a predetermined lighting value to a result of the addition, based on Equation (2) above.

When in Step 302 the pixel (b3) detected while sequentially detecting the pixels forming the third image is "0", that is, when a pixel of the second area 420 of the third image is detected, in step 306 the shader unit 173 detects, from the pixels of the first image, a pixel (b1) placed in a location corresponding to the pixel (b3) of the third image, and detect, from the pixels of the second image, a pixel (b2) placed in a location corresponding to the pixel (b3) of the third image.

In Step 307, the shader unit 173 performs rendering of the 2D GUI by applying the pixel (b2) of the second image to the pixel (b1) of the first image without a lighting calculation operation, based on the first image pixel (b1) times the second image pixel (b2), as described above.

After performing either Step 304 or Step 307, the method proceeds to Step 308 in which the shader unit 173 senses whether the pixel exists in the third image and repeats Steps 301 through 307.

While Steps 301 through 307 are repeatedly performed, when a pixel that is not detected is not found to exist in the third image, the shader unit 173 proceeds to Step 309 and outputs, to the display unit, a 2D GUI including a 3D lighting effect that is applied to only an area corresponding to the first area 410 of the third image by repeatedly performing operations of Steps 301 through 307.

Figures 5A, 5B, 5C, 5D:
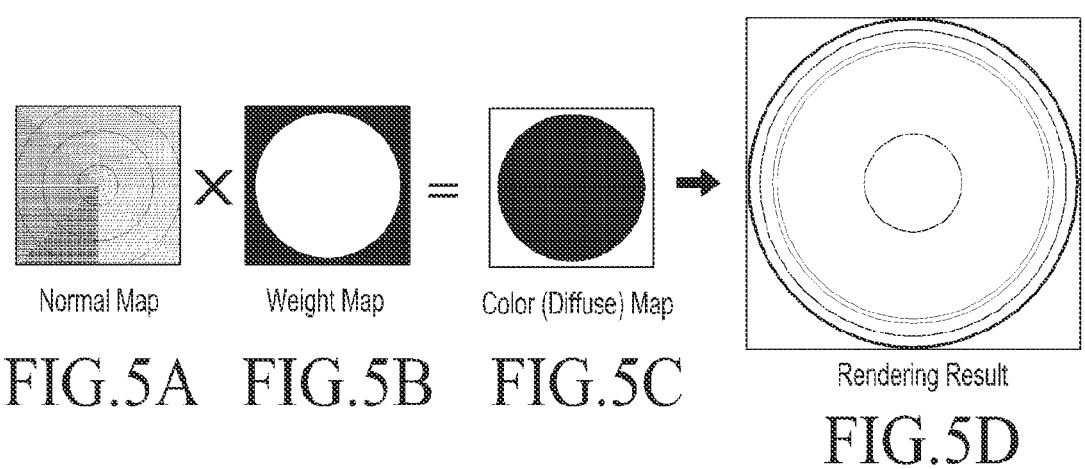

FIG. 5 illustrates the operation of Step 309 that outputs, to the display unit 160, a 2D GUI rendering result, as shown in FIG. 5D to which a partial 3D lighting effect is applied, as a lighting calculation operation ((a)*(b)+(c)) is performed with respect to a portion to which a lighting is to be applied using Equation (2) and the lighting calculation operation is skipped ((a)*(c)) for a portion to which lighting is not to be applied based on the first image pixel (b1) times the second image pixel (b2), as described above, while Steps 301 through 307 are repeatedly performed.

Although FIG. 3 illustrates a partial lighting calculation operation through Equation (2) and the first image pixel (b1) multiplied by the second image pixel (b2), the partial lighting calculation operation may also be equivalently performed through Equation (1).

The 3D lighting processing device and method according to embodiments of the present invention may be embodied by a non-transitory computer readable recording medium and a computer readable code.

The computer-readable recording medium includes all the types of recording devices in which data readable by a computer system are stored. As for such a recording medium, for example, a ROM, a RAM, an optical disc, a magnetic tape, a floppy disc, a hard disc, or a non-volatile memory may be used, and a medium implemented in a type of carrier wave, e.g., Internet transmission, may also be included in such a recording medium. In addition, the computer-readable recording medium may be stored with non-transitory codes which are distributed in computer systems connected by a network such that the non-transitory codes can be read and executed by a computer in a distributed method.

While the present invention has been shown and described with reference to certain embodiments thereof, it is merely illustrative, and it will be understood by those skilled in the art that various changes and modifications in form and details may be made therein. Accordingly, the true technical protection scope of the present invention shall be determined on the basis of the spirit and scope of the present invention as defined by the appended claims.

What is claimed is:

1. A three-dimensional (3D) lighting processing device comprising:
   a first information providing unit configured to provide a first image including normal direction information for a shade effect and a second image including color information;
   a second information providing unit configured to provide a third image including lighting area information; and
   a shader unit configured to detect, from the first image and the second image, an area corresponding to the lighting area information of the third image as a lighting application area, and performs rendering by applying the detected lighting application area to a two-dimensional (2D) Graphic User Interface (GUI).

2. The 3D lighting processing device of claim 1, wherein the first image includes a normal map image that provides, as a normal vector, a normal direction value indicating an inclination value with respect to each side of an object, and
   wherein the second image includes a color map that provides the color information.

3. The 3D lighting processing device of claim 1, wherein the third image is divided into a first area to which a lighting effect is to be applied and a second area to which the light effect is not to be applied, and includes a weight map image that provides a distinguishing pixel value for each of the first area and the second area.

4. The 3D lighting processing device of claim 3, wherein a pixel of the weight map image includes a value in a range from 0.0 to 1.0, and
   a pixel of the first area has a value different from zero.

5. The 3D lighting processing device of claim 1, wherein the shader unit performs a lighting calculation operation with respect to the detected lighting application area to provide a partial 3D lighting effect to the 2D GUI.

6. The 3D lighting processing device of claim 1, wherein the shader unit does not perform a lighting calculation operation with respect to an area that does not correspond to the lighting area information of the third image in the first image, when rendering the 2D GUI.

7. The 3D lighting processing device of claim 1, wherein the shader unit performs a lighting calculation operation with respect to the lighting application area and performs rendering of the 2D GUI based on $$N*W+C*(1.0-W),$$

wherein the N is
   a 3D lighting value calculated by applying a predetermined lighting value to pixels of a Normal Map (a first image), the W is a pixel of a Weight Map (a third image), and the C is a pixel of a Color Map (a second image).

8. The 3D lighting processing device of claim 1, wherein the shader unit performs a lighting calculation operation with respect to the lighting application area and performs rendering of the 2D GUI based on $$((a1)*(a3)+(a2))*LV,$$

wherein the a3 is a pixel of a first area to which a lighting effect is to be applied in the third image, the a1 is a pixel placed in a location corresponding to the third image pixel (a3) from among pixels of the first image, the a2 is a pixel placed in a location corresponding to the third image pixel (a3) from among pixels of the second image, and
   wherein the lighting value (LV) is a value predetermined for a lighting effect.

9. The 3D lighting processing device of claim 1, wherein the shader unit does not perform a lighting calculation operation with respect to an area that does not correspond to the lighting area information of the third image in the first image, and performs rendering of the 2D GUI, based on a first image pixel (b1) * a second image pixel (b2),
   wherein the first image pixel (b1) is a pixel placed in a location corresponding to a pixel (b3) of a second area to which the lighting effect is not applied in the third image, from among the pixels of the first image, and
   wherein the second image pixel (b2) is a pixel placed in a location corresponding to the pixel (b3) of the second area to which the lighting effect is not applied in the third image, from among the pixels of the second image.

10. A three-dimensional (3D) lighting processing method comprising:
    providing a first image including normal direction information for a shade effect, a second image including color information, and a third image including lighting area information associated with an area to which a lighting effect is to be applied; and
    detecting an area corresponding to the lighting area information of the third image from the first image and the second image, as a lighting application area, and performing rendering by applying the detected lighting application area to a two-dimensional (2D) Graphic User Interface (GUI).

11. The 3D lighting processing method of claim 10, wherein the first image includes a normal map image that provides, as a normal vector, a normal direction value indicating an inclination value with respect to each side of an object, and
    wherein the second image includes a color map that provides the color information.

12. The 3D lighting processing method of claim 10, wherein the third image is divided into a first area to which the lighting effect is to be applied and a second area to which the lighting effect is not to be applied, and includes a weight map image that provides a distinguishing pixel value for each of the first area and the second area.

13. The 3D lighting processing method of claim 12, wherein a pixel of the weight map image includes a value in a range from 0.0 to 1.0, and a pixel of the first area has a value different from zero.

14. The 3D lighting processing method of claim 10, further comprising performing a lighting calculation operation with respect to the detected lighting application area to provide a partial 3D lighting effect to the 2D GUI.

15. The 3D lighting processing method of claim 10, wherein a lighting calculation operation is not performed with respect to an area that does not correspond to the lighting area information of the third image in the first image, when performing rendering of the 2D GUI.

16. The 3D lighting processing method of claim 10, comprising performing a lighting calculation operation with respect to the lighting application area and rendering the 2D GUI based on $$N*W+C*(1.0-W),$$

wherein the N is
a 3D lighting value is-calculated by applying a predetermined lighting value to pixels of a Normal Map (a first image), the W is a pixel of a Weight Map (a third image), and the C is a pixel of a Color Map (a second image).

17. The 3D lighting processing method of claim 10, further comprising performing a lighting calculation operation with respect to the lighting application area and rendering the 2D GUI based on $$((a1)*(a3)+(a2))*(LV),$$

wherein the a3 is a pixel of a first area to which lighting effect is to be applied in the third image, the a1 is a pixel placed in a location corresponding to the third image pixel (a3) from among pixels of the first image, the a2 is a pixel placed in a location corresponding to the third image pixel (a3) from among pixels of the second image, and the lighting value (LV) is a value predetermined for a lighting effect.

18. The 3D lighting processing method of claim 10, further comprising performing a lighting calculation operation with respect to an area that does not correspond to the lighting area information of the third image in the first image and rendering the 2D GUI, based on:

a first image pixel (b1) * a second image pixel (b2), wherein the first image pixel (b1) is a pixel placed in a location corresponding to a pixel (b3) of a second area to which the lighting effect is not applied in the third image, from among the pixels of the first image, and the second image pixel (b2) is a pixel placed in a location corresponding to the pixel (b3) of the second area to which the lighting effect is not applied in the third image, from among the pixels of the second image.

* * * * *